(12) United States Patent
Wee et al.

(10) Patent No.: US 11,606,376 B2
(45) Date of Patent: Mar. 14, 2023

(54) CAN BUS PROTECTION SYSTEMS AND METHODS

(71) Applicant: Battelle Memorial Institute, Columbus, OH (US)

(72) Inventors: Colin Wee, Columbus, OH (US); Ian LoVerde, Centreville, VA (US); Douglas A. Thornton, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 281 days.

(21) Appl. No.: 16/935,505

(22) Filed: Jul. 22, 2020

(65) Prior Publication Data

US 2021/0029148 A1    Jan. 28, 2021

Related U.S. Application Data

(60) Provisional application No. 62/878,419, filed on Jul. 25, 2019.

(51) Int. Cl.
*G06F 21/00* (2013.01)
*H04L 9/40* (2022.01)
(Continued)

(52) U.S. Cl.
CPC ........ *H04L 63/1425* (2013.01); *G06F 21/572* (2013.01); *H04L 12/40* (2013.01);
(Continued)

(58) Field of Classification Search
CPC ... H04L 63/1425; H04L 12/40; H04L 63/166; H04L 63/20; H04L 2012/40215;
(Continued)

(56) References Cited

U.S. PATENT DOCUMENTS

| 9,792,435 B2 | 10/2017 | Harris et al. |
| 9,843,594 B1 | 12/2017 | Evans et al. |

(Continued)

FOREIGN PATENT DOCUMENTS

| CN | 102592080 A | * 7/2012 |
| CN | 106 250 767 A | 12/2016 |

(Continued)

OTHER PUBLICATIONS

U.S. Appl. No. 14/857,073, filed Sep. 17, 2015, Mayhew, Kevin.

(Continued)

*Primary Examiner* — Trong H Nguyen
*Assistant Examiner* — Michael M Lee
(74) *Attorney, Agent, or Firm* — Lippes Mathias LLP (57) ABSTRACT

CAN bus signal format inference includes: extracting candidate signals from training CAN bus message traffic; defining one or more signals, each signal being a candidate signal that matches structural characteristics of a matching data type and each signal being assigned the matching data type; and generating an inferred CAN bus protocol with which the defined one or more signals conform. Signals are extracted from CAN bus message traffic using the inferred CAN bus protocol, an anomaly in an extracted signal is detected, and an alert is generated indicating the detected anomaly. In another aspect, a transport protocol (TP) signal is extracted and analyzed to determine a fraction of the TP signal that matches opcodes of a machine language instruction set, and an anomaly is detected based at least in part on the determined fraction exceeding an opcode anomaly threshold.

20 Claims, 5 Drawing Sheets

(51) Int. Cl.
*G06F 21/57* (2013.01)
*H04L 12/40* (2006.01)

(52) U.S. Cl.
CPC ............ *H04L 63/166* (2013.01); *H04L 63/20* (2013.01); *H04L 2012/40215* (2013.01); *H04L 2012/40273* (2013.01)

(58) Field of Classification Search
CPC .......... H04L 2012/40273; H04L 67/34; H04L 12/40104; G06F 21/572; G06F 21/552
See application file for complete search history.

(56) References Cited

U.S. PATENT DOCUMENTS

| | | | |
|---|---|---|---|
| 10,083,071 B2 | 9/2018 | Sonalker et al. | |
| 10,298,612 B2 | 5/2019 | Galula et al. | |
| 10,361,934 B2 | 7/2019 | Elend et al. | |
| 2009/0281676 A1* | 11/2009 | Beavis | H04L 12/12 700/295 |
| 2014/0337680 A1* | 11/2014 | Hwang | H04L 1/1809 714/748 |
| 2016/0381067 A1 | 12/2016 | Galula et al. | |
| 2017/0060559 A1* | 3/2017 | Ye | G06F 8/65 |
| 2017/0315778 A1* | 11/2017 | Sano | H03M 7/28 |
| 2019/0026103 A1* | 1/2019 | Van Der Maas | H04L 63/20 |
| 2019/0044912 A1* | 2/2019 | Yang | G06F 21/50 |
| 2020/0067955 A1* | 2/2020 | Hass | H04L 12/4625 |
| 2020/0274927 A1* | 8/2020 | Richmond | H04L 69/08 |
| 2021/0021610 A1* | 1/2021 | Ahire | H04L 63/1416 |
| 2021/0144099 A1* | 5/2021 | Meier | H04L 12/413 |

FOREIGN PATENT DOCUMENTS

| | | | | |
|---|---|---|---|---|
| DE | 102019128729 A1 * | 5/2020 | ............ | B60W 30/08 |
| JP | 2011248516 A * | 12/2011 | | |

OTHER PUBLICATIONS

U.S. Appl. No. 62/878,419, filed Jul. 25, 2019, Wee, Colin.
Wajape Mahesh et al.: "Study of ISO 14229-1 and ISO 15765-3 and implementation in EMS ECU for EEPROM for UDS application", 2014 IEEE International Conference on Vehicular Electronics and Safety, IEEE, Dec. 16, 2014 (Dec. 16, 2014), pp. 168-173, XP032749072, DOI: 10.1109/ICVES.2014.7063742 [retrieved on Mar. 18, 2015] Abstract, section I.
International Search Report dated Oct. 2, 2020 in PCT/US2020/042995.

* cited by examiner

CAN BUS PROTECTION SYSTEMS AND METHODS

CROSS-REFERENCE TO RELATED APPLICATIONS

This application claims the benefit of U.S. Provisional Patent Application Ser. No. 62/878,419 filed Jul. 25, 2019 and titled "CAN BUS PROTECTION SYSTEMS AND METHODS", which is incorporated herein by reference in its entirety.

STATEMENT REGARDING FEDERALLY SPONSORED RESEARCH OR DEVELOPMENT

This invention was made with government support under contract number 00029001 awarded by the Office of Naval Research. The government has certain rights in the invention.

BACKGROUND

The following relates to the electronic data network security arts, Controller Area Network (CAN) security arts, electronic control unit (ECU) security arts, ground vehicle electronic security arts, water vehicle electronic security arts, space vehicle electronic security arts, and the like.

Modern vehicles employ modularized electronic components, such as anti-brake system (ABS) modules, engine control modules, and modules for controlling steering, throttle, cruise control, climate control systems, and various other vehicle functions. These modules intercommunicate by way of a CAN bus. Ancillary systems such as vehicle entertainment systems, navigation systems, or so forth also sometimes include ECUs that are connected into the CAN bus. Communications over the CAN bus at the application layer consist of an arbitration identifier (ARB ID) and up to eight data bytes. The ARB ID signifies the meaning of the data contained within the message. For example, wheel speeds could be contained on ARB ID 0x354 with two bytes of data representing the rotational speed for each of the four wheels. Every ECU on the vehicle that has need to know the wheel speed is programmed to associate ARB ID 0x354 with the wheel speed. Information conveyed on by the data bytes is referred to as a signal. With up to eight bytes per message, a single message can convey any signal of up to eight bytes. Furthermore, a single message can convey two or more signals if the individual signals are represented by fewer than eight bytes (up to eight signals each consisting of a single byte). Conversely, a signal that requires more than eight bytes can be conveyed by two or more messages. An example of such a situation is sending a firmware update to an ECU. The firmware update can be considered to be a single signal, but one that may consist of hundreds, thousands, or more bytes. To address such situations, an application layer CAN protocol, known as a CAN-TP protocol (where "TP" indicates "Transfer Protocol"), allows for sending a longer signal such as a firmware update via multiple messages. The international standard ISO 15765-2 (also known as ISO-TP) is a common implementation of the CAN-TP protocol, however other protocols achieving the same function exist.

The CAN bus advantageously enables the ad hoc addition of new electronic components. This is ideal for automotive manufacturers that sell vehicles in a range of models with different features, as well as being ideal for after-market manufacturers supplying (for example) after-market sound systems.

However, this open architecture introduces security challenges. Any ECU on the CAN bus (or, more generally, any electronic device on the CAN bus) can be connected with the CAN bus (or an ECU already connected with the CAN bus can be compromised) and can then transmit messages on the CAN bus, and these messages are received by every ECU or other electronic device on the CAN bus. The messages do not include authentication to identify the sender in a secure manner. Hence, there is no barrier to a device being added to the CAN bus that is programmed (or an existing device compromised so as to be programmed) to mimic legitimate transmissions by employing the same ARB ID headers and payload format as are used in the legitimate transmissions, and thereby performing unauthorized and potentially malicious activities via the CAN bus. Such malicious activities could range from unauthorized collection of data to potentially life-threatening actions such as inducing unsafe throttle or braking actions. With the larger payload capacities of CAN-TP transmissions, there is even the potential to transmit malicious code to an ECU, thereby hacking the firmware of the ECU and reprogramming it to perform malicious acts.

Harris et al., U.S. Pat. No. 9,792,435 issued Oct. 17, 2017 and titled "Anomaly Detection for Vehicular Networks for Intrusion and Malfunction Detection" is incorporated herein by reference in its entirety. Sonalker et al., U.S. Pat. No. 10,083,071 issued Sep. 25, 2018 and titled "Temporal Anomaly Detection on Automotive Networks" is incorporated herein by reference in its entirety. These patents describe some approaches for detecting anomalous messaging on a CAN bus, thereby providing alerts of potentially malicious activity on the CAN bus.

Accordingly, there is provided herein certain improvements to the security and responsiveness of the CAN architecture.

BRIEF SUMMARY

In accordance with some illustrative embodiments disclosed herein, an electronic device comprises an electronic processor communicatively coupled with a Controller Area Network (CAN) bus, and a non-transitory storage medium that stores descriptor files representing a plurality of CAN bus protocols and instructions readable and executable by the electronic processor to perform a CAN bus security method. The method includes: extracting signals from CAN bus message traffic on the CAN bus wherein each extracted signal conforms with one of the plurality of CAN bus protocols; detecting an anomaly in an extracted signal; and generating an alert indicating the detected anomaly.

In some embodiments, the electronic device of the immediately preceding paragraph further comprises electronics configured to perform a CAN bus signal format inference method including: extracting candidate signals from training CAN bus message traffic wherein each candidate signal is a time sequence of repetitions of an ordered group of data bits in the CAN bus message traffic wherein the ordered group of data bits is delineated by one or more message headers; defining one or more signals wherein each signal is a candidate signal that matches structural characteristics of a matching data type and each signal is assigned the matching data type; and generating a descriptor file representing an inferred CAN bus signal format with which the defined one or more signals conform. The plurality of CAN bus protocols referenced in the immediately preceding paragraph then includes the inferred CAN bus signal format. The electronics may comprise the electronic processor and the non-transitory storage medium of the immediately preceding paragraph in which the storage medium further stores instructions readable and executable by the electronic processor to perform the CAN bus signal format inference method, and/or may comprise a training electronic processor different from the electronic processor of the immediately preceding paragraph and a training non-transitory storage medium different from the non-transitory storage medium of the immediately preceding paragraph, in which the training storage medium stores instructions readable and executable by the training electronic processor to perform the CAN bus signal format inference method.

In accordance with some illustrative embodiments disclosed herein, a non-transitory storage medium stores instructions readable and executable by at least one electronic processor to perform a CAN bus signal format inference method comprising: extracting candidate signals from training CAN bus message traffic wherein each candidate signal is a time sequence of repetitions of an ordered group of data bits in the CAN bus message traffic wherein the ordered group of data bits is delineated by one or more message headers; defining one or more signals wherein each signal is a candidate signal that matches structural characteristics of a matching data type and each signal is assigned the matching data type; and generating an inferred CAN bus signal format with which the defined one or more signals conform.

In accordance with some illustrative embodiments disclosed herein, an electronic device comprises an electronic processor connectable with a Controller Area Network (CAN) bus, and a non-transitory storage medium storing (i) one or more machine language instruction sets wherein each machine language instruction set comprises a set of opcodes and (ii) instructions readable and executable by the electronic processor to perform a CAN bus security method. The method includes: extracting a transport protocol (TP) signal comprising data bytes of a plurality of messages conforming with a CAN TP protocol from CAN bus message traffic on the CAN bus; for each machine language instruction set of the one or more machine language instruction sets, determining a fraction of the TP signal that matches opcodes of the machine language instruction set; and detecting an anomaly based at least in part on at least one of the determined fractions exceeding an opcode anomaly threshold.

BRIEF DESCRIPTION OF THE DRAWINGS

Any quantitative dimensions shown in the drawing are to be understood as non-limiting illustrative examples. Unless otherwise indicated, the drawings are not to scale; if any aspect of the drawings is indicated as being to scale, the illustrated scale is to be understood as non-limiting illustrative example.

DETAILED DESCRIPTION

The goal of anomaly detection in the context of CAN bus security is to detect anomalous messages on the CAN bus that may be deemed to be suspicious. This approach is employed because, from the vantage of a generic security component monitoring traffic on the CAN bus, the informational content of CAN bus messages is generally unknown. Hence, the detection of unusual, i.e. anomalous, messages serves as a surrogate for detection based on knowledge of the information content. Additionally, detected anomalies may represent a foreshadowing of component failure and be associated with maintenance issues.

A CAN bus provides a physical transport layer that can support a wide range of higher-layer signal formats. A signal format of a signal identifies the message header that is associated with the signal (e.g., a specific ARB ID or portion thereof), and defines the structural representation with which the signal conforms. The structural representation typically includes the data type (e.g. counter, constant, integer, floating point) and associated properties such as byte count, endianness, and/or so forth. Some of these higher-layer signal formats are published protocols for which the signal format is publicly available as a DBC file or other signal format storage. Some examples of published CAN bus protocols include SAE J1939, ISO14229, MilCAN, and so forth. Even in the case of a published CAN bus protocol, detection of anomalies is challenging since the informational content of the messages is not always known, e.g., when portions of the published protocol are reserved for proprietary data. Nonetheless, knowledge of the published protocol provides information on signal formats of the signals being conveyed. For example, knowledge of the published protocol enables the anomaly detection to recognize that a given set of data bytes of a message represents a signal of integer data type (or of floating point data type, or so forth). This knowledge permits more sophisticated anomaly detection, such as based on unexpected signal values.

However, some ECUs communicate on the CAN bus using proprietary signals whose signal formats are not publicly known. In this case not only is the informational content unknown, but even the signal formats are unknown. This substantially increases the challenge for anomaly detection. Signal-agnostic anomaly detectors can be constructed, such as those disclosed in Harris et al., U.S. Pat. No. 9,792,435 and Sonalker et al., U.S. Pat. No. 10,083,071. However, additional information on the signals and their signal formats would permit more advanced anomaly detection.

Some anomaly detection approaches disclosed herein leverage the insight made herein that knowledge of how data is generally structured can be used to infer structure within proprietary messages. By inferring structure, the underlying data are treated as structured data, including identification of signals conveyed in the CAN bus messages and the data types of the signals. This knowledge of the structure can decrease training time and increase efficacy of downstream anomaly detection algorithms. The disclosed approaches for signal extraction are applicable to proprietary signal formats in which the underlying data is structured (i.e., is made up of signals of designated signal formats), but that structure is unknown. The disclosed signal extraction does not extract the informational content of the underlying data, but rather extracts the signals and their data types. The signal extraction is trained on CAN bus traffic, and this training can be done offline and/or online (e.g., adaptive training to fine-tune the signal extraction in real-time). The method can still work if the messages on the CAN bus are encrypted, provided that the decryption keys are present and messages and or signals are decrypted prior to or during the signal extraction phase.

A particularly concerning modality of malicious attack is the potential delivery of executable code to an ECU in a manner that causes the ECU to execute the code. This can occur in various ways. In one approach, if the ECU firmware is updatable via the CAN bus, for example using CAN-TP, then an attacker can transmit an illegitimate firmware update to the ECU that follows the design-basis protocol for firmware updating via the CAN bus. In another approach, the CAN-TP can transmit a large block of executable code that leads to a stack overflow or other memory leak in a poorly designed ECU processing architecture, and the overflowed or memory leaked executable code may then be executed by the ECU. These are merely some non-limiting examples of this type of attack.

Some anomaly detection approaches disclosed herein are designed to detect anomalies that could credibly be attempts to transmit illegitimate executable code to an ECU for the purpose of causing it to execute the illegitimate code. These approaches include identification of blocks of data bytes transmitted under a CAN-TP protocol, and then searching the data bytes for opcodes of a machine language instruction set. The machine language instruction set may, for example, be the instruction set of a central processing unit (CPU) architecture, or the instruction set of a virtual machine architecture such as a Java Virtual Machine (JVM), or so forth. It will be appreciated that these opcode detector approaches can be usefully combined with the signal extraction approaches also disclosed herein, in order to extend application of the opcode detector to protocols like CAN-TP, which cause the aggregation of message data in the processor's memory. However, the disclosed opcode detector approaches can also be used without the signal extraction, with the opcode detector limited to published CAN-TP protocols such as ISO 15765-2.

Figure 1:
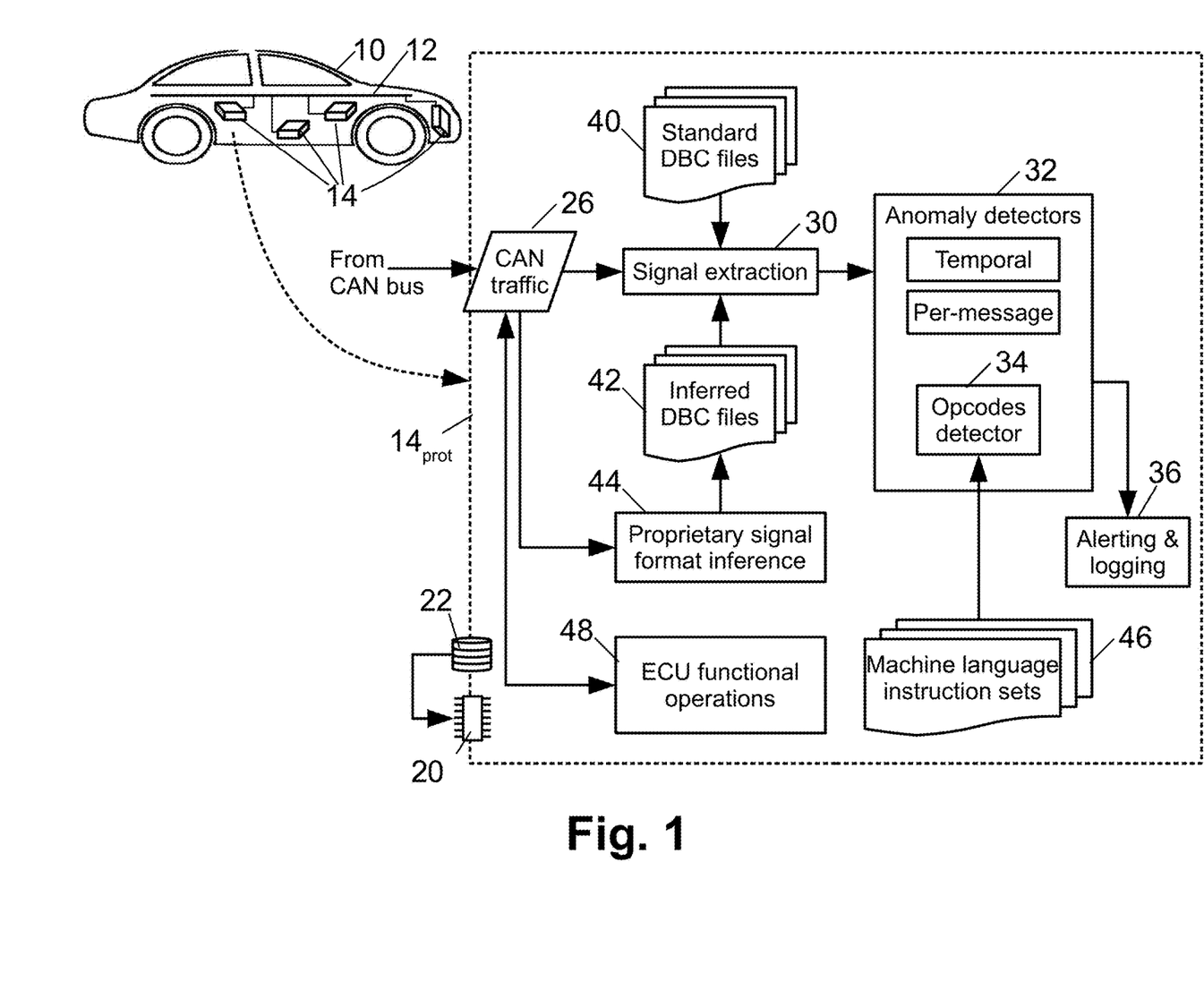
FIG. 1 presents a diagrammatic representation of a vehicle having a CAN bus, and a functional diagram of one ECU on the CAN bus which implements embodiments of anomaly detection as disclosed herein.

With reference to FIG. 1, a vehicle 10 includes a Controller Area Network (CAN) bus 12 to which several Electronic Control Units (ECUs) 14 are connected. More generally, the vehicle 10 may be a ground vehicle (e.g. an automobile 10 as illustrated, or a truck, off-road vehicle, motorcycle, bus, or the like), a water vehicle (e.g. an ocean-going ship, a submarine, or the like), or a space vehicle (e.g. an orbiting satellite, an interplanetary probe, or the like). More generally, the ECUs can be any electronic device that is connected with the CAN bus or other network 12, such as: engine control modules, ABS modules, power steering modules, and/or other vehicle operation-related electronic devices; car stereos or other in-vehicle entertainment systems; radio transceivers used for off-vehicle communication (e.g., a communications satellite transceiver); vehicle climate control modules; and/or so forth. The CAN bus 12 is a promiscuous network in which traffic on the CAN bus is received by all electronic devices on the CAN bus and the traffic on the CAN bus does not include message authentication. Message authentication in this context is information contained in the message, or in the architecture of the network, by which the receiving device can verify the source of the message. A CAN bus does not provide message authentication. Messages on the CAN bus comprise payloads and message headers. Often the header is the arbitration identifier (ARB ID) itself. However, there are circumstances where the ARB ID includes additional information not considered a part of the header for signal extraction & identification purposes, such as the J-1939 ARB ID including 3 priority bits.

With continuing reference to FIG. 1, at least one protection ECU $14_{prot}$ (or, more generally, an electronic device $14_{prot}$ on the CAN bus 12) includes anomaly detection capability as diagrammatically represented in FIG. 1. The protection ECU $14_{prot}$ includes an electronic processor 20 and a non-transitory storage medium 22 storing instructions which are readable and executable by the electronic processor 20. The hardware components 20, 22 may be variously implemented. For example, in some embodiments, the electronic processor 20 and the non-transitory storage medium 22 may be separate integrated circuit (IC) chips disposed on a printed circuit board (PCB, not shown) with conductive traces of the PCB operatively connecting the processor 20 and storage medium 22. As some examples, the electronic processor 20 may comprise a microprocessor or microcontroller IC chip and the non-transitory storage medium 22 may comprise a memory IC chip such as a flash memory chip, read-only memory (ROM) IC chip, electronically programmable read-only memory (EPROM) IC chip, or so forth. In other embodiments, the electronic processor 20 and the non-transitory storage medium 22 may be monolithically integrated as a single IC chip As some examples, the ECU $14_{prot}$ is implemented as an Application-Specific Integrated Circuit (ASIC) chip or Field Programmable Gate Array (FPGA) chip in which both the storage and the digital processor are monolithically fabricated on a single ASIC or FPGA. As already noted, the ECU $14_{prot}$ receives CAN traffic 26 from the CAN bus 12.

With continuing reference to FIG. 1, the instructions stored on the non-transitory storage medium 22 are readable and executable by the electronic processor 20 to perform signal extraction 30 as disclosed herein, to implement one or more anomaly detector(s) 32 (e.g., a temporal anomaly detector, a per-message anomaly detector, an illustrative opcodes detector 34, and/or so forth), and to implement alerting and/or logging 36 of anomalies detected by the anomaly detector(s) 32. The signal extraction 30 utilizes standard DBC files 40 which store the signal format for published CAN bus protocols. (More generally, another file format besides DBC is contemplated for storing the standard protocol signal formats). Additionally, the signal extraction 30 utilizes proprietary DBC files 42 which store proprietary CAN bus signal formats which have been inferred from analysis of CAN bus traffic as disclosed herein. The standard and proprietary DBC files 40, 42 are suitably stored on the non-transitory storage medium 22.

In some embodiments, the instructions stored on the non-transitory storage medium 22 are further readable and executable by the electronic processor 20 to perform a proprietary CAN bus signal format inference 44 as disclosed herein to generate the proprietary DBC files 42. In other embodiments, the disclosed proprietary CAN bus signal format inference 44 is performed offline, that is, by some other electronic processor (e.g. a desktop computer, server computer, or so forth) to generate the proprietary DBC files 42 which are then transferred to the ECU $14_{prot}$ via the CAN bus 12 or by another transfer mechanism (e.g. preloaded onto the ECU $14_{prot}$ prior to its installation on the vehicle 10) and are stored on the non-transitory storage medium 22 for access by the signal extraction 30 executing on the electronic processor 20. In yet other embodiments, a combination of these two approaches may be employed, e.g. an instance of the proprietary CAN bus signal format inference may be performed offline to generate initial proprietary DBC files 42 which are subsequently updated in real-time by an instance of the proprietary CAN bus signal format inference 44 executed by the electronic processor 20 during operation of the vehicle 10.

Furthermore, the opcodes detector 34 utilizes a database of machine language instruction sets 46 which stores the instruction sets for various CPU and/or virtual machine architectures that may credibly be expected to be deployed in ECUs connected to the CAN bus 12. Some typical CPU architectures include (by way of nonlimiting illustrative example): Intel x86, 8051, et cetera CPU architectures; ARM A32, T32, A64, et cetera CPU architectures, various RISC and SPARC architectures, and so forth. The machine language instruction set for a CPU architecture identifies the opcodes that are recognized and executable by CPUs conforming to that CPU architecture. Similarly, virtual machines such as a Java Virtual Machine (JVM) employ instructions which are sometimes referred to as byte codes or some other similar nomenclature. The machine language instruction set for a CPU or virtual machine architecture identifies the opcodes that are recognized and executable by a CPU or virtual machine conforming to that architecture. In general, machine language instructions executable by a CPU or virtual machine consist of opcodes and operands. The opcode identifies the operation to be performed, and the operand(s) provide any data needed for execution of the opcode. (Some opcodes may not have any associated operands). Any given CPU or virtual machine architecture recognizes and is capable of executing a finite set of opcodes, and these are identified in the database of machine language instruction sets 46, which is suitably stored on the non-transitory storage medium 22.

In some embodiments, the ECU $14_{prot}$ is a dedicated electronic device that only performs anomaly detection. In other embodiments, the ECU $14_{prot}$ is an ECU that performs some other function (for example, the ECU $14_{prot}$ could be an ABS module controlling anti-lock braking, a cruise control module, or so forth). In such embodiments, the instructions stored on the non-transitory storage medium 22 are further readable and executable by the electronic processor 20 to perform ECU functional operations 48, such as ABS module functionality to control the anti-lock braking or so forth. As diagrammatically shown in FIG. 1, the ECU functional operations 48 may in some cases generate messages that are transmitted via the CAN bus 12, i.e. the ECU functional operations 48 may inject messages into the CAN traffic 26. Typically, these outgoing messages are not processed by the operations 30, 32, 34, 36 (although it is alternatively contemplated to also process the outgoing messages by the operations 30, 32, 34, 36, for example in case the ECU $14_{prot}$ is itself hacked to modify its performance of the ECU functional operations 48).

The term "signal" in the context of a CAN bus is a single, self-contained unit of data. A signal could be a sensor measurement of one variable, e.g., the engine coolant temperature. It could also be a digital command, e.g., a torque request. Multiple signals can reside in a single message, like four 8-bit tire pressure signals in a single CAN message. Or, a signal can reside in multiple messages, such as when the J-1939 Transport Protocol is being used to transfer a firmware update. A firmware update can be viewed as a single signal transmitted via a CAN-TP protocol. More generally, a signal is the underlying information. A signal does not contain the supporting signal format or header.

Signal extraction has two regimes, the training regime corresponding to the proprietary CAN bus signal format inference 44, and the operation regime corresponding to the signal extraction 30. In one embodiment, the training occurs before deployment on a corpus of CAN bus traffic, preferably encompassing the expected operating envelope of the CAN bus on which the signal extraction 30 will subsequently be deployed. In another embodiment, the training is performed online after installation, and prior to the security apparatus being activated. A third embodiment combines these two options, by performing pre-deployment training followed by ongoing adaptive update training during deployment. The training (i.e., the proprietary CAN bus signal format inference 44) identifies structure within the CAN bus traffic. The operation regime (i.e. the signal extraction 30) utilizes the trained structure to extract signals from the raw data stream in real-time. These two regimes communicate through the non-volatile storage medium 22. The illustrative embodiments use descriptor files a format commonly employed for CAN bus protocols, namely the DBC format created by Vector Informatik GmbH. However, other descriptor file formats may be employed, such as JSON or XML. During training the identified signal formats for proprietary signals is written to a descriptor file for each signal format. Moreover, it should be noted that the proprietary CAN bus signal format inference 44 is so referenced because typically an unknown CAN bus signal whose signal format needs to be inferred is a proprietary signal format. However, more generally, the proprietary CAN bus signal format inference 44 can be used to infer the signal format of any CAN bus signal whose signal format is unavailable, regardless of the reason why the signal format is not available.

Figure 2:
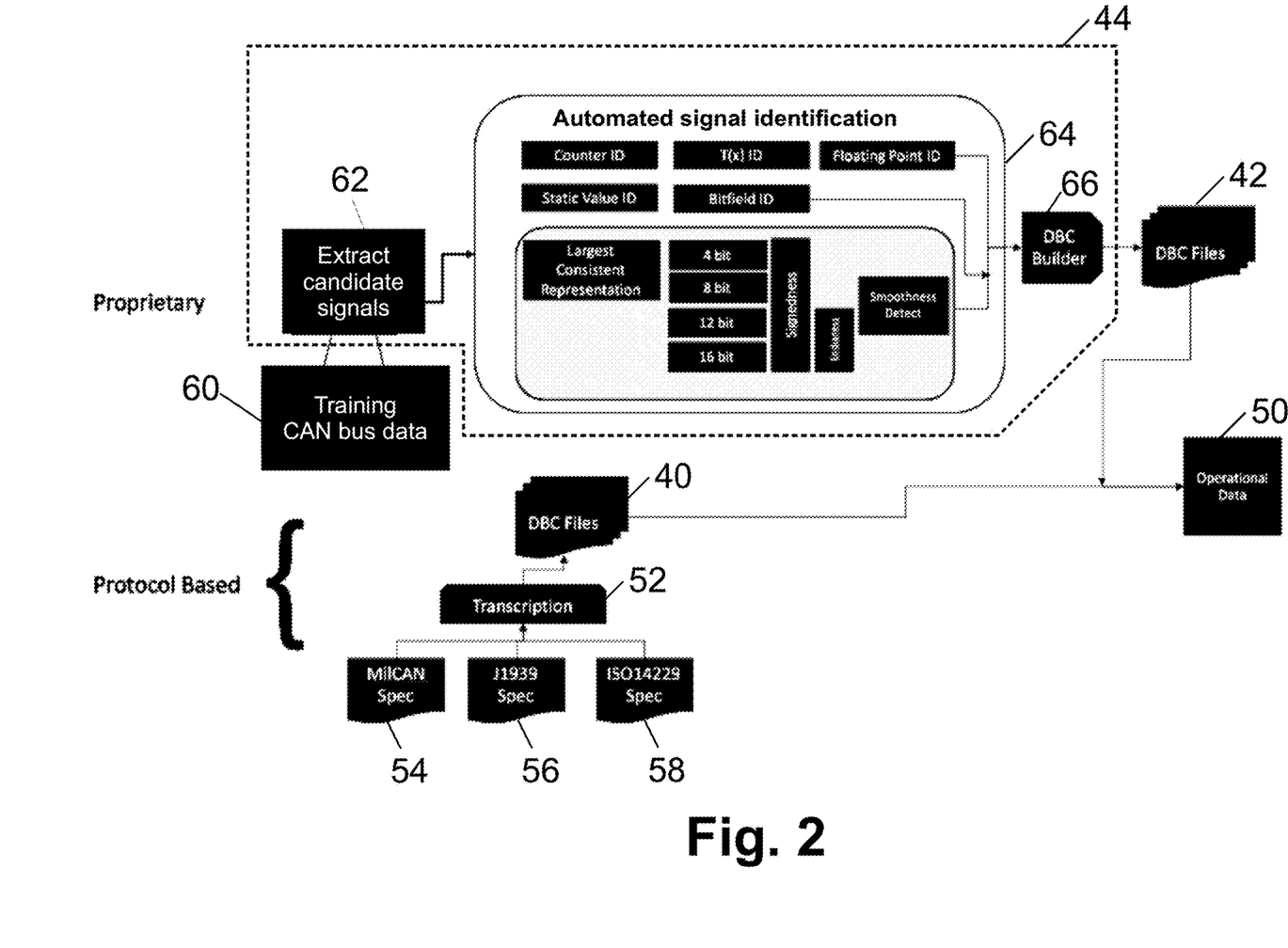
FIG. 2 diagrammatically shows an illustrative embodiment of the proprietary CAN bus signal format inference block of FIG. 1.

With reference now to FIG. 2, an illustrative embodiment of the proprietary CAN bus signal format inference 44 is described. The output of the proprietary CAN bus signal format inference 44 is descriptor files shown as DBC files 42 providing operational data 50. FIG. 2 also shows the handling of protocol based, non-proprietary signals whose signal formats do not need to be inferred. These standard DBC files 40 are explicitly programmed from the protocol definition, e.g. transcribed 52 into the descriptor files 40 through manual programming, the purchasing of the information in transcribed format, automated extraction from protocol documentation, or so forth. In the nonlimiting illustrative example of FIG. 2, the standard DBC files 40 include DBC files for standard MICAN 54, J1939 56, and ISO14229 58.

With continuing reference to FIG. 2, The illustrative proprietary CAN bus signal format inference 44 provides automated signal format identification trained on training CAN bus data 60 including proprietary signals in the signal format to be inferred. The input training CAN bus data 60 is suitably collected from an instrumented platform or hardware in loop simulations over the expected operating envelope. The training CAN bus data 60 should capture movement of all signals sufficient to identify the full data width. The training CAN bus data 60 need not need be perfect; for example, if a signal is defined as 16 bits, but the most significant 4 bits are never excited and effectively unmeasurable, then successful identification needs only register 12 bits. The proprietary CAN bus signal format inference 44 takes in the raw data 60 and performs programmatic reverse engineering steps to find signal format. In an operation 62, candidate signals are extracted from the training CAN bus message traffic 60. Each candidate signal is a time sequence of repetitions (i.e. repeated broadcasts) of an ordered group of data bits in the CAN bus message traffic 60, in which the ordered group of data bits is delineated by one or more message headers. In an operation 64, one or more signals are defined. Each signal is a candidate signal that matches structural characteristics of a matching data type, and each signal is assigned the matching data type. In the following, the processing of operation 64 is described for the nonlimiting examples of a counter data type, a constant data type, a floating point data type, an integer data type, and a bit-field data type.

A signal assigned a counter data type is defined as a candidate signal that matches a structural characteristic of the counter data type, in which values of the ordered group of data bits defined by the counter data type monotonically increase or monotonically decrease over the time sequence (i.e. with successive broadcasts) of the ordered group of data bits. A counter is a monotonically increasing or decreasing field. Generally, these values are used to ensure the active communication by a module and that a module has not been temporarily taken off network, causing skipped values, or a thread has frozen, causing a repeated value to be sent. Counters are identified by looking for a constant difference between broadcasts of the signal. Roll overs (i.e. when the value crosses either the maximum or minimum value) can be handled by identifying the monolithic increasing or deceasing over subintervals of the time sequence. The width of the counter is inferred by first finding a bit that alternates, which represents the least significant bit of the counter. The next higher bit is searched for adjacent to the first bit by identifying a bit that changes with ever $2^{nd}$ change of the first bit. Depending upon the endianness, this change could be at a preceding or following bit. The second bit defines the endianness, if the Big-Endian, the second bit will proceed the first, if Little-Endian the second bit will follow the first. After identifying the $2^{nd}$ bit of the counter, the search continues in either the little-endian or big-endian direction, as defined by the second bit, until the pattern of the bit no longer changes with every other change of the proceeding bit. A counter can range in size from a single bit, to multiple bytes.

A signal assigned a constant data type is defined as a candidate signal that matches a structural characteristic of the constant data type, in which values of the ordered group of data bits are constant over the time sequence (i.e. over repeated broadcasts) of the ordered group of data bits. Finding a signal of constant data type values entails identifying a candidate signal for which the set of bits making up the ordered group of data bits never changes. A constant value could be an empty place holder, or it could be a signal that is not excited under normal conditions. If it is the later, identifying changes in the constant signal would be an anomaly that is easily detected once the constant signal is recognized. Some examples of constant signal include a device serial number, software version, or an identification number. The signals that may be inferred as constant could indeed represent a signal with changing information, however that information is not excited under normal circumstances. For example, a signal may represent the state of the airbags as deployed (represented by a first signal value) or not-deployed (represented by a second signal value). Under trained and ordinary conditions that signal would be constant (namely, being the second signal value representing not-deployed). In the event of an airbag deployment event, the signal would change to the first value and thus be marked as anomalous, which is a correct determination, in that the vehicle is experiencing an anomaly in expected behavior at the time of deployment.

A signal assigned a floating point data type having an exponent and a mantissa is defined as a candidate signal that matches structural characteristics of the floating point data type. These structural characteristics include: the ordered group of data bits being sixteen, thirty-two, or sixty-four bits; and a first subset of the ordered group of data bits representing the exponent of the floating point data type having lower entropy over the time sequence than a second subset of the ordered group of data bits representing the mantissa of the floating point data type. Floating point numbers are defined by the IEEE as 16, 32, and 64 bits. Even larger sizes are available; however, it is unlikely that an ECU would use 64 bits or higher precision. Identifying signals of a floating point data type entails finding a smooth, low entropy output, through swapping endianness and performing a search. In general, the exponent is expected to change less frequently than the mantissa. In terms of entropy, the mantissa is expected to be more disordered (i.e. have higher entropy) than the exponent. To see this, consider a floating point value that varies between 1 and 999. Using an exponential notation of the form 0.MMMEXX where "MMM" denotes the mantissa and "XX" denotes the exponent, this range can be written as 0.100E01 to 0.999E03. As can be seen, the mantissa varies over essentially its entire range; whereas, the exponent varies only from 01 to 03. This example employs base ten whereas floating point signals on a CAN bus employ binary, i.e. base two, but the principle remains the same: the mantissa is usually of higher entropy than the exponent, and this structural characteristic of floating point data types is leveraged to detect these signals.

A signal assigned an integer data type is defined as a candidate signal that matches structural characteristics of the integer data type. These structural characteristics include: the ordered group of data bits being four, eight, twelve, sixteen, or thirty-two bits; and a first subset of the ordered group of data bits representing most significant bits of the integer data type having lower entropy over the time sequence than a second subset of the ordered group of data bits representing least significant bits of the integer data type. As the data in a platform generally represents measurements or control parameters, the data represents slowly fluctuating values. These slow fluctuations result in a time-series history that is smooth, with only minimal changes between messages. Thus, from an information theory perspective, the data channel (the total bits of the signal) is communicating significantly less information per unit time then it is capable of communicating. This characteristic results in a signal having low entropy. When the data is represented incorrectly, the lower bits are placed into higher bit positions, resulting in greater signal variability. The signal than appears to change rapidly, resulting in a higher perceived transfer of information per time unit, and thus higher entropy. In general, integer representations include a variety of bit sizes, endianness, and signedness. The objective is to find the largest consistent representation that is smooth for the test data. Each permutation needs to be examined for smoothness, achieved via an entropy measure. Using a time history of the message, each permutation of size and endianness is tested and the best, most smooth fit is identified. The smooth fit is determined numerically using a time-series entropy calculation, often referred to as an approximate entropy technique, or Sample Entropy. Here the approximate entropy calculation is executed with identical parameters for all permutations, resulting in each permutation having a resulting quantitative entropy value. The bit size is typically between 4, 8, 12, 16, and 32 bits. Most ECU data that is in integer format is 16 bits or less, with 32 bits often used only for clocks. There are two forms of signedness, either unsigned or two's complement. Finally, the endianness represents the byte ordering, i.e., which byte reflects the most significant bit, and how those bytes are packed into a message. Byte ordering is only a criterion for those signals greater than 8 bits.

A signal assigned a bit-field data type is defined as a candidate signal that matches structural characteristics of the bit-field data type. A bit field data type is where single bits or a grouping of single bits represent a binary state. This binary state can be reflected as a subset of a byte in a CAN message, e.g., 0000 0011 could represent the brake being active, and 0000 0000 could represent the brake being inactive. Alternatively, the message could be 0000 0010 for active, or 0000 0001 for inactive. In these preceding representations, the left most 6 bits could represent other states. It is common to use more than one bit to represent the state to mitigate single bit errors in memory or in transmission. Detection of bit fields occurs by searching adjacent bits that always have the same relationship, e.g., equal or not equal, and the value changes at least once in the training dataset.

In order to identify the Largest Consistent Representation, different combinations of the aforementioned integer representations are interpreted as a signal, then tested for smoothness. More specifically, testing for smoothness involves analyzing the entropy of the interpreted signal and testing it for plausible continuity as time progresses. Interpretations of the signal that are either too discontinuous or entropic are considered invalid. The largest interpretation (in terms of number of bits needed to represent it) is chosen as the most likely representation of the integer. In one suitable formulation of the foregoing, the structural characteristics of the integer data type may further include: values of the ordered group of data bits defined by the integer data type having continuity over the time sequence satisfying a continuity criterion; and values of the ordered group of data bits defined by the integer data type having continuity over the time sequence satisfying an entropy criterion. If there is constant data in the higher order bits, it is possible for the above method to estimate that those bits belong to the signal rather than being a signal of their own. To this effect, no error in anomaly detection is made because the constant bits changing would in fact represent an anomalous event.

With continuing reference to FIG. 2, the one or more signals defined in the operation 64 is output to a DBC builder 66 to describe the signal formats of the defined signals in the DBC files 42. These DBC files 42 save the trained result of the signal format inference phase 44, so that when CAN messages carrying signals in an inferred signal format are encountered again, the DBC file 42 can be referenced to quickly interpret the signal correctly. The DBC file is defined to relate a signal to a header, and the structural representation of that signal. The anomaly detection extends the common format to also include other features, such as expected frequency of reception, variability of frequency of reception, upper and lower limits, and other meta-data that assists in the identification of an anomaly.

Figure 3:
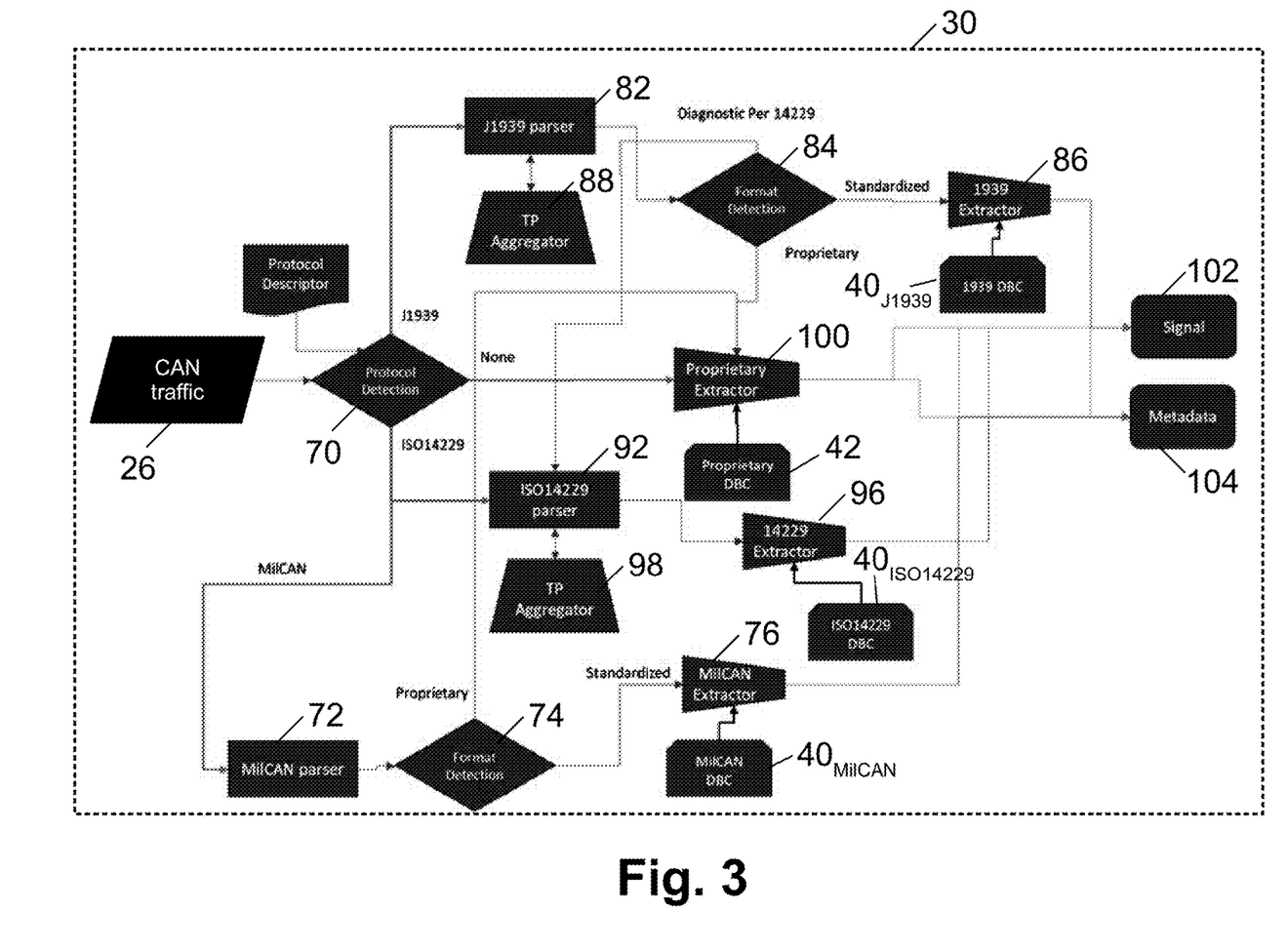
FIG. 3 diagrammatically shows an illustrative embodiment of the signal extraction block of FIG. 1.

With reference now to FIG. 3, an illustrative embodiment of the signal extraction 30 is shown. All branches of control flow are enumerated (naming each protocol specifically), in order to show that some protocols can be layered upon others. Without loss of generality, a protocol detection operation 70 first attempts to identify the protocol used using one of the standard DBCs 40, then parse the message with the appropriate protocol's DBC. For example, a MilCAN parser 72 attempts to identify the protocol as MilCAN. If at a decision 74 the MilCAN protocol is recognized, then a MilCAN signal extractor 76 is applied to extract the signal using the MilCAN DBC $40_{MilCAN}$. Likewise, a J1939 parser 82 attempts to identify the protocol as J1939. If at a decision 84 the J1939 protocol is recognized, then a J1939 signal extractor 86 is applied to extract the signal using the J1939 DBC $40_{J1939}$. As the J1939 protocol supports CAN-TP, the J1939 parser 82 may call a TP aggregator 88 if a J1939 CAN-TP variant is encountered. Likewise, an ISO 14229 parser 92 attempts to identify the protocol as ISO 14229. If at a decision (not shown due to space constriction) the ISO 14229 protocol is recognized, then an ISO 14229 signal extractor 96 is applied to extract the signal using the J1939 DBC $40_{J1939}$. As the ISO 14229 protocol supports CAN-TP, the ISO 14229 parser 92 may call a TP aggregator 98 if an ISO 14229 CAN-TP variant is encountered. It will be appreciated that these are only illustrative examples, and signals employing additional and/or other standard protocols may be similarly extracted. If the parsed message is in a proprietary format (and thus does not have a standard DBC), then a signal extractor 100 uses the proprietary DBC 42 generated as part of the training phase (described with reference to FIG. 2) to extract any available signals and metadata. All extracted signals 102 and metadata 104 (both standard or proprietary) are collected and output to the next phase in the pipeline.

With reference back to FIG. 1, the signals extracted as described with reference to FIGS. 2 and 3 can be leveraged by the anomaly detectors 32 in various ways. As previously noted, if a signal is identified as being of a constant data type, then any deviation of that signal from its expected constant value can be flagged as an anomaly. More generally, the signal extraction 30 may be performed over an initial time interval to extract signals which conform with respective CAN bus signal formats. Then, some embodiments of the anomaly detectors 32 may operate by detecting as an anomaly any deviation of one of the extracted signals from the conforming CAN bus signal format over a later time interval subsequent to the initial time interval.

As another example, the opcodes detector 34 may leverage detection of a CAN-TP or similar signal in order to focus opcode detection on these many byte signals, as the large payload of such a signal provides opportunity for a cyberattack in which malicious machine code is delivered to an ECU. It is assumed that an opcode based attack will need to transfer a minimum number of opcodes to have efficacy. With reference back to FIG. 1, in the following some embodiments of the opcodes detector 34 are described.

Figure 4:
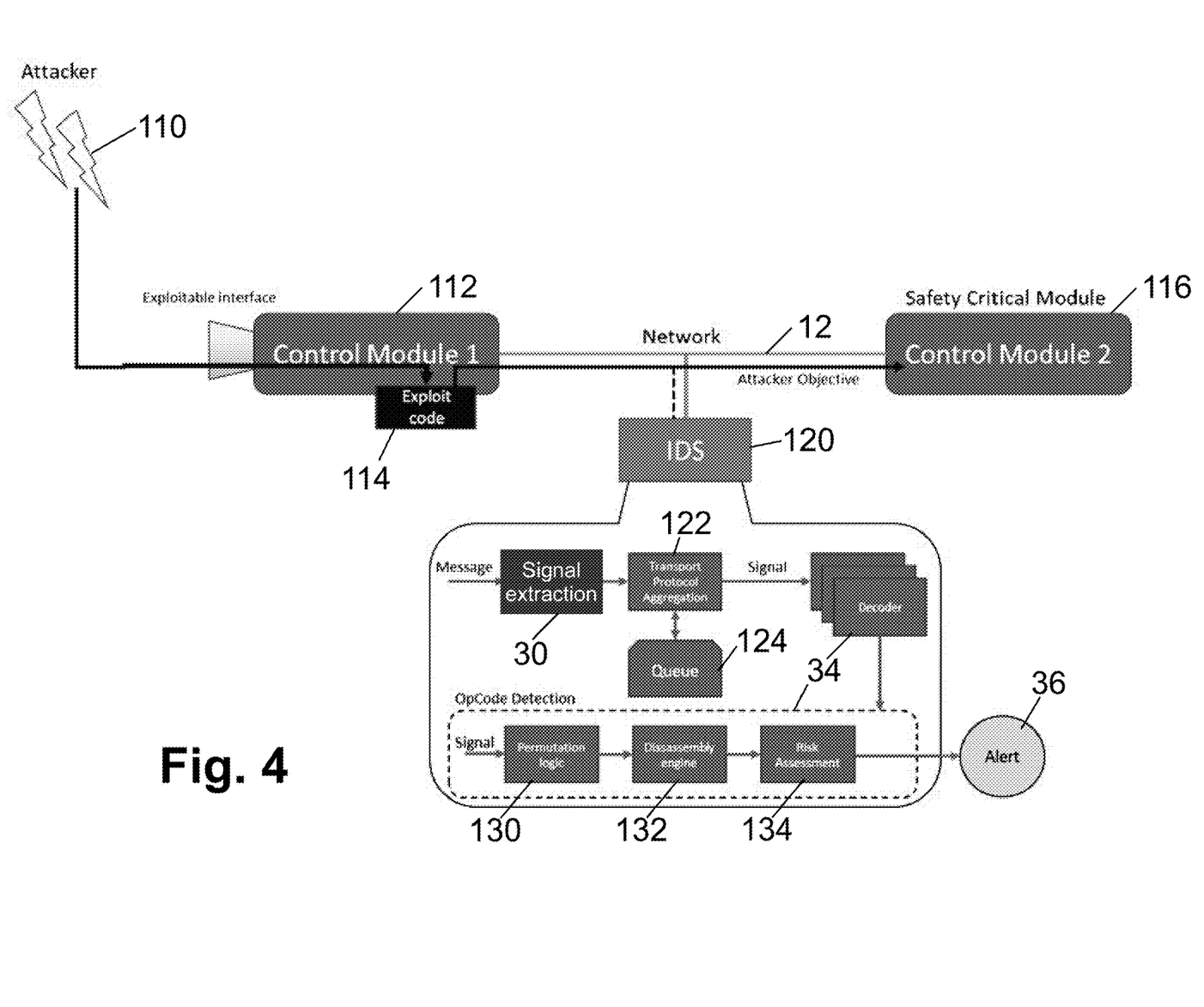
FIG. 4 diagrammatically shows an illustrative embodiment of the opcodes detector block of FIG. 1.

With reference now to FIG. 4, the opcodes detector 34 is configured to detect binary payloads containing machine code that are sent across the CAN bus 12, thus protecting against the opcode execution threat. A typical attack on the CAN bus 12 of the vehicle 10 which attempts to cause an ECU to execute code is diagrammatically shown in FIG. 4, where an attacker 110 compromises an ECU or other electronic device 112 on the CAN bus 12 to inject exploit machine code 114 that is received and executed by another ECU or electronic device 116 also on the CAN bus 12. An Intrusion Detection System (IDS) 120 (for example, embodied as the ECU $14_{prot}$ of FIG. 1) on the CAN bus 12 also receives the malicious payload try 114 which is intended by the attacker 110 to infect the ECU or other electronic component 116. This is the case because the CAN bus 12 is a promiscuous network in which every device on the network receives every message.

The likelihood of an attacker leveraging individual CAN messages into a code execution exploit is low. Even if poor coding practices somehow permitted execution of machine code contained in an individual CAN message, only 8 bytes of data would be available for the opcodes containing the exploit, commonly known as shell code. However, when a CAN-TP protocol is used, multiple messages are aggregated into a single signal. This aggregation provides a larger volume of data and with it much greater potential to excite a vulnerability. By way of one nonlimiting illustrative example of one possible attack, consider an x509 Certificate parser, where a new certificate is to be uploaded to a control module. The certificate is several kilobytes in size. If the certificate is parsed by poorly designed code then this may allow an attacker to incorporate shell code into the certificate and then redirect program flow to that code. As another example, a firmware update may be transmitted to an ECU via the CAN bus 12, and as a promiscuous network there is no barrier to a malicious actor with sufficient knowledge of the firmware updating process to craft an illegitimate firmware update that will then be received and executed by the ECU. In general, once higher-level CAN-TP protocols are used to aggregate multiple messages, the risks of code execution through common software vulnerabilities become realistic.

With continuing reference to FIG. 4, the output of the signal extraction 30 identifies a signal in a CAN-TP protocol, or similar signal larger then a predetermined number of bytes, e.g. 32. At an operation 122, the payload of the CAN-TP signal is aggregated and queued in a queue 124. The extracted payload is inspected to detect valid opcodes. As previously noted, opcodes are the machine language instructions of a CPU or virtual machine instruction set that an attacker incorporates into malicious 'shell code' in order to execute a cyberattack. The promiscuous nature of the CAN bus 12 allows the IDS 120 to also extract these CAN TP payloads and inspect them for large quantities of valid opcodes for a CPU or virtual machine architecture used in ECUs or other electronic devices on (or potentially on) the CAN bus 12. Opcodes that belong to the instruction set of a CPU or virtual machine are recognized and executable by that CPU or virtual machine; however, as the opcodes are binary sequences, they may also occur by chance in benign messages.

In view of this, in one approach the detection of suspicious machine code in a CAN-TP signal comprising data bytes of a plurality of messages conforming with a CAN TP protocol is performed as follows. For each machine language instruction set of the one or more machine language instruction sets 46, the fraction of the TP signal that matches opcodes of the machine language instruction set is determined. This is repeated for each machine language instruction of the set of machine language instruction sets 46, since it is not known a priori which CPU or virtual machine architecture may be the target of a cyberattack. An anomaly is detected based (at least in part) on at least one of the determined fractions exceeding an opcode anomaly threshold. That is, to discern the level of threat, the fraction of the message that represents valid opcodes is considered, optionally along with other factors such as the continuity of opcodes. This information is analyzed to create a confidence measure that is forwarded to the alerting engine 36.

Figure 5:
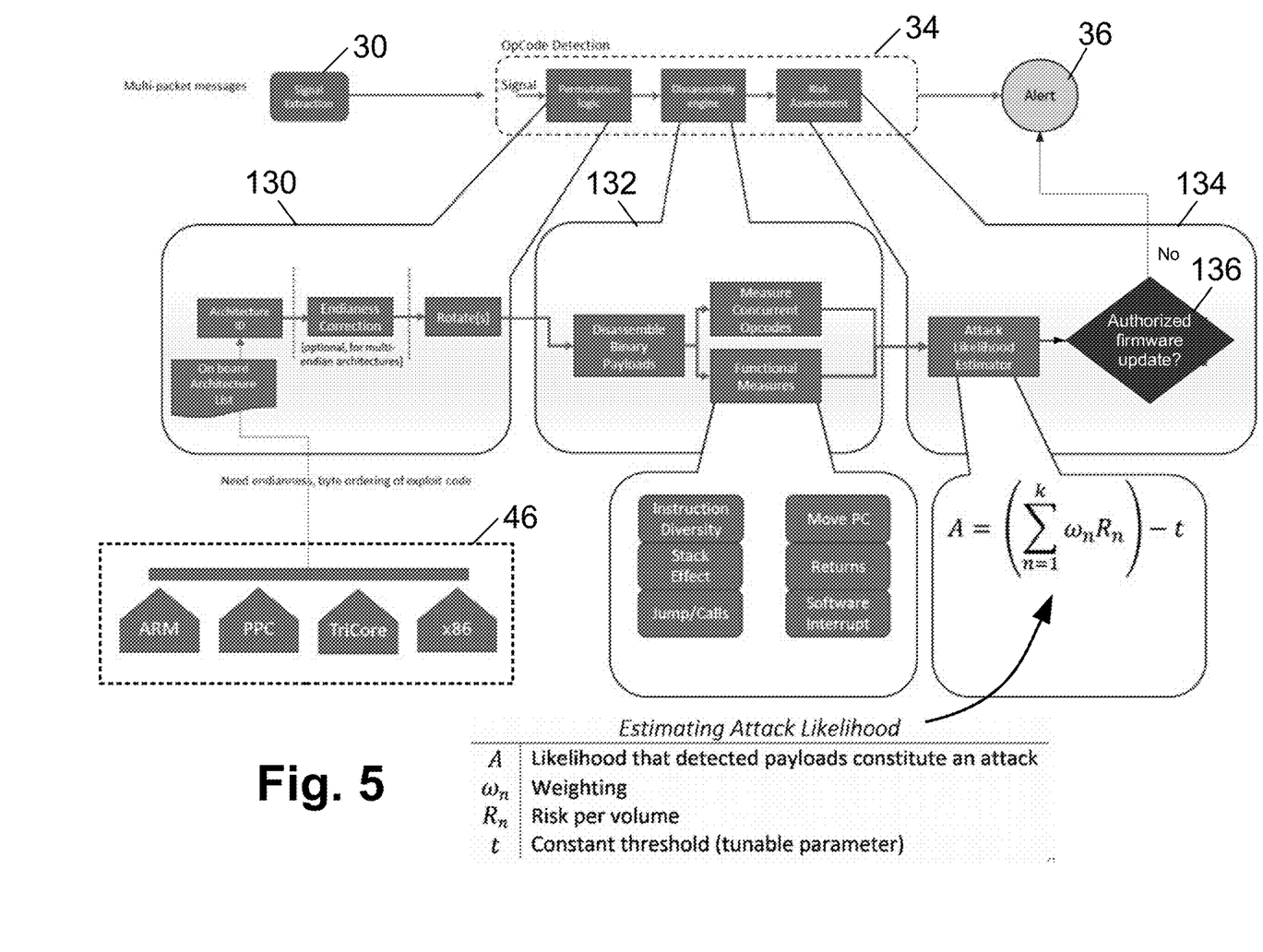
FIG. 5 diagrammatically shows an expanded representation of the opcodes detector shown in FIG. 4.

With continuing reference to FIG. 4 and with further reference to FIG. 5, an illustrative implementation of the opcodes detector 34 is described in further detail. In an operation 130, the bytes of the payload are matched to opcodes of a machine language instruction set. To do this, the bytes must be interpreted appropriately. Different protocols may affect the endianness and rotation of opcodes, the operation 130 tests different combinations of endianness and rotation to determine if there is an endianness and rotation of the bytes that produces valid opcodes for one of the known architectures (that is, that match opcodes of a machine language instruction set). Once these are known, in an operation 132 the identified opcodes are analyzed to determine the fraction of the CAN-TP signal which is made up of opcodes of a given machine language instruction set and optionally to determine other metrics that may be probative of whether the payload contains suspicious machine code. For example, specific functional measures that are indicative of an attempt to gain malicious code execution may include (in addition to the fraction of the payload made up of opcodes) metrics of instruction diversity, stack effect, the fraction of opcodes which are jumps or calls or otherwise operate to move the program counter (PC) or instruction pointer (IP) (depending upon the CPU or virtual machine architecture), the fraction of opcodes which implement return operations, and/or the fraction of opcodes that implement software interrupts. Opcodes that move the PC or IP, or that implement return or interrupt operations, are of particular concern since these can be used to redirect program flow to the injected malicious code. In an operation 134, the fraction of the TP signal that matches opcodes of the machine language instruction set, along with other optional metrics, are analyzed to compute a likelihood that the CAN-TP signal constitutes a cyberattack. If this likelihood exceeds some alerting threshold then the alerting/logging 36 is invoked to log the anomaly. In the illustrative example of FIG. 5, the operation 134 computes the likelihood of threat as:

$$A = \left( \sum_{n=1}^{k} \omega_n R_n \right) - t \qquad (1)$$

where A is the likelihood of threat, k is the number of computed metrics and index n runs over the k metrics, $\omega_n$ is a weight for the $n^{th}$ metric, $R_n$ is a risk per unit volume of payload for the $n^{th}$ metric, and t is a tuning parameter.

In general, the presence of detected machine language content in a CAN-TP signal is of concern. However, there may be some instances in which machine language content in a CAN-TP signal may be benign. For example, if an ECU receives firmware updates via the CAN bus 12 then legitimate firmware updates are benign messages that should be received and executed by the ECU. To accommodate these types of situations, an optional decision operation 136 (shown only in FIG. 5) checks whether the CAN-TP signal is an authorized firmware update, and an anomaly is flagged only if the CAN-TP signal is not identified as an authorized firmware update. For example, a certificate or other authentication mechanism may be employed, which is securely delivered to and stored at the ECU $14_{prot}$. Thereafter, if a CAN-TP signal is determined to contain machine code but also contains the certificate or other authentication then the decision 136 recognizes the authenticated firmware update and does not flag it as an anomaly.

With reference back to FIG. 1, the alert/logging 36 can take various forms, and the type of alert (or whether any alert is issued at all) and/or the anomalies which are logged may depend on the type of anomaly. In some illustrative examples: an alert may be displayed on a dashboard of the vehicle 10 (e.g. by the ECU $14_{prot}$ sending alert messages to an ECU controlling the dashboard); an alert may be transmitted to the vehicle manufacturer via a 3G, 4G, 5G, or other cellular communication link or other wireless link (assuming the vehicle 10 is equipped with such wireless communication); an alert may be logged in memory of the ECU $14_{prot}$ for later retrieval using a handheld or automotive shop-based CAN bus code reader; and/or so forth.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

To aid the Patent Office and any readers of this application and any resulting patent in interpreting the claims appended hereto, applicants do not intend any of the appended claims or claim elements to invoke 35 U.S.C. § 112(f) unless the words "means for" or "step for" are explicitly used in the particular claim

We claim:

1. An electronic device comprising:
    an electronic processor communicatively coupled with a Controller Area Network (CAN) bus; and
    a non-transitory storage medium storing descriptor files representing a plurality of CAN bus protocols and instructions read and executed by the electronic processor to perform a CAN bus security method including:
        extracting signals from CAN bus message traffic on the CAN bus wherein each extracted signal conforms with one of the plurality of CAN bus protocols,
        detecting an anomaly in an extracted signal, and
        generating an alert indicating the detected anomaly; and
    electronics configured to perform a CAN bus signal format inference method including:
        extracting candidate signals from training CAN bus message traffic wherein each candidate signal is a time sequence of repetitions of an ordered group of data bits in the CAN bus message traffic wherein the ordered group of data bits is delineated by one or more message headers,
        defining one or more signals wherein each signal is a candidate signal that matches structural characteristics of a matching data type and the each signal is assigned the matching data type, and
        generating a descriptor file representing an inferred CAN bus signal format with which the defined one or more signals conform;
    wherein the plurality of CAN bus protocols includes the inferred CAN bus signal format, and
        wherein the electronics comprise at least one of: (i) the electronic processor and the non-transitory storage medium further storing instructions read and executed by the electronic processor to perform the CAN bus signal format inference method and/or (ii) a training electronic processor different from the electronic processor and a training non-transitory storage medium different from the non-transitory storage medium and storing instructions read and executed by the training electronic processor to perform the CAN bus signal format inference method.

2. The electronic device of claim 1, wherein the defining of one or more signals includes:
    defining a signal assigned with a counter data type as the candidate signal that matches a structural characteristic of the counter data type in which values of the ordered group of data bits defined by the counter data type monotonically increase or monotonically decrease over the time sequence of the ordered group of data bits.

3. The electronic device of claim 1, wherein the defining of one or more signals includes:
    defining a signal assigned with a constant data type as the candidate signal that matches a structural characteristic of the constant data type in which values of the ordered group of data bits are constant over the time sequence of the ordered group of data bits.

4. The electronic device of claim 1, wherein the defining of one or more signals includes:
    defining a signal assigned with a floating point data type having an exponent and a mantissa as the candidate signal that matches structural characteristics of the floating point data type including:
        the ordered group of data bits being sixteen, thirty-two, or sixty-four bits; and
        a first subset of the ordered group of data bits representing the exponent of the floating point data type having lower entropy over the time sequence than a second subset of the ordered group of data bits representing the mantissa of the floating point data type.

5. The electronic device of claim 1, wherein the defining of one or more signals includes:
    defining a signal assigned with an integer data type as the candidate signal that matches structural characteristics of the integer data type including:
        the ordered group of data bits being four, eight, twelve, sixteen, or thirty-two bits; and
        a first subset of the ordered group of data bits representing most significant bits of the integer data type having lower entropy over the time sequence than a second subset of the ordered group of data bits representing least significant bits of the integer data type.

6. The electronic device of claim 5, wherein the defining of the signal assigned with the integer data type that matches said structural characteristics of the integer data type further including:
    values of the ordered group of data bits defined by the integer data type having continuity over the time sequence satisfying a continuity criterion; and
    values of the ordered group of data bits defined by the integer data type having continuity over the time sequence satisfying an entropy criterion.

7. The electronic device of claim 1, wherein the defining of one or more signals includes:
    defining a signal assigned with a bit-field data type as a candidate signal that matches a structural characteristic of the bit-field data type in which values of the ordered group of data bits are indicative of a binary state.

8. The electronic device of claim 1, wherein:
    the extracting is performed over an initial time interval; and
    the detecting comprises detecting a deviation of one of the extracted signals from the conforming one of the plurality of CAN bus protocols over a later time interval subsequent to the initial time interval.

9. The electronic device of claim 1, wherein the descriptor files are DBC files.

10. The electronic device of claim 1, wherein:
the non-transitory storage medium further stores one or more machine language instruction sets wherein each machine language instruction set comprises a set of opcodes;
the extracting includes extracting a transport protocol (TP) signal comprising data bytes of a plurality of messages conforming with a CAN-TP protocol; and
the detecting includes:
for each machine language instruction set of the one or more machine language instruction sets, determining a fraction of the TP signal that matches opcodes of the machine language instruction set; and
detecting the anomaly based at least in part on at least one of the determined fractions exceeding an opcode anomaly threshold.

11. An electronic device comprising:
an electronic processor communicatively coupled with a Controller Area Network (CAN) bus; and
a non-transitory storage medium storing (i) one or more machine language instruction sets wherein each machine language instruction set comprises a set of opcodes and (ii) instructions read and executed by the electronic processor to perform a CAN bus security method including:
extracting a transport protocol (TP) signal comprising data bytes of a plurality of messages conforming with a CAN-TP protocol from CAN bus message traffic on the CAN bus;
for each machine language instruction set of the one or more machine language instruction sets, determining a fraction of the TP signal that matches opcodes of the machine language instruction set; and
detecting an anomaly based at least in part on at least one of the determined fractions exceeding an opcode anomaly threshold,
wherein detecting the anomaly further comprises performing byte rotation on bytes of the TP signal before matching the TP signal with opcodes of the machine language instruction set.

12. The electronic device of claim 11, wherein the detecting comprises:
performing endianness corrections on bytes of the TP signal before matching the TP signal with the opcodes of the machine language instruction set.

13. The electronic device of claim 11, wherein the detecting comprises:
detecting the anomaly if (I) at least one of the determined fractions exceeds as the opcode anomaly threshold and (II) the TP signal is not identified as an authorized firmware update.

14. A non-transitory storage medium storing instructions read and executed by at least one electronic processor to perform a CAN bus signal format inference method comprising:
extracting candidate signals from training CAN bus message traffic wherein each candidate signal is a time sequence of repetitions of an ordered group of data bits in the CAN bus message traffic wherein the ordered group of data bits is delineated by one or more message headers;
defining one or more signals wherein each signal is a candidate signal that matches structural characteristics of a matching data type and the each signal is assigned the matching data type;
generating an inferred CAN bus protocol with which the defined one or more signals conform;
generating a descriptor file representing an inferred CAN bus signal format with which the defined one or more signals conform;
extracting a signal from CAN bus message traffic on a CAN bus wherein the extracted signal conforms with the inferred CAN bus protocol;
detecting an anomaly in the extracted signal; and
generating an alert indicating the detected anomaly.

15. The non-transitory storage medium of claim 14, wherein the defining of one or more signals includes:
defining the signal assigned with a counter data type as the candidate signal that matches a structural characteristic of the counter data type in which values of the ordered group of data bits defined by the counter data type monotonically increase or monotonically decrease over the time sequence of the ordered group of data bits.

16. The non-transitory storage medium of claim 14, wherein the defining of one or more signals includes:
defining the signal assigned with a constant data type as the candidate signal that matches a structural characteristic of the constant data type in which values of the ordered group of data bits are constant over the time sequence of the ordered group of data bits.

17. The non-transitory storage medium of claim 14, wherein the defining of one or more signals includes:
defining the signal assigned with a floating point data type having an exponent and a mantissa as the candidate signal that matches structural characteristics of the floating point data type including:
the ordered group of data bits being sixteen, thirty-two, or sixty-four bits; and
a first subset of the ordered group of data bits representing the exponent of the floating point data type having lower entropy over the time sequence than a second subset of the ordered group of data bits representing the mantissa of the floating point data type.

18. The non-transitory storage medium of claim 14, wherein the defining of one or more signals includes:
defining the signal assigned with an integer data type as the candidate signal that matches structural characteristics of the integer data type including:
the ordered group of data bits being four, eight, twelve, sixteen, or thirty-two bits; and
a first subset of the ordered group of data bits representing most significant bits of the integer data type having lower entropy over the time sequence than a second subset of the ordered group of data bits representing least significant bits of the integer data type.

19. The non-transitory storage medium of claim 18, wherein the defining of the signal assigned with the integer data type that matches said structural characteristics of the integer data type further including:
values of the ordered group of data bits defined by the integer data type having continuity over the time sequence satisfying a continuity criterion; and
values of the ordered group of data bits defined by the integer data type having continuity over the time sequence satisfying an entropy criterion.

20. The non-transitory storage medium of claim 14, wherein the defining of one or more signals includes:
  defining the signal assigned with a bit-field data type as the candidate signal that matches a structural characteristic of the bit-field data type in which values of the ordered group of data bits are indicative of a binary state.

* * * * *